United States Patent
Lengers et al.

(10) Patent No.: US 9,976,580 B2
(45) Date of Patent: May 22, 2018

(54) FLUID ACTUATOR FOR INFLUENCING THE FLOW ALONG A FLOW SURFACE, AS WELL AS BLOW-OUT DEVICE AND FLOW BODY COMPRISING A LIKE FLUID ACTUATOR

(71) Applicant: Airbus Operations GmbH, Hamburg (DE)

(72) Inventors: Matthias Lengers, Emsdetten (DE); Ulrich Scholz, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 339 days.

(21) Appl. No.: 13/851,656

(22) Filed: Mar. 27, 2013

(65) Prior Publication Data

US 2013/0291981 A1 Nov. 7, 2013

Related U.S. Application Data

(63) Continuation of application No. PCT/EP2011/004834, filed on Sep. 27, 2011.
(Continued)

(30) Foreign Application Priority Data

Sep. 27, 2010 (DE) .......................... 10 2010 046 667

(51) Int. Cl.
*F15C 1/22* (2006.01)
*F15D 1/00* (2006.01)
(Continued)

(52) U.S. Cl.
CPC .............. *F15D 1/008* (2013.01); *B64C 21/04* (2013.01); *F15B 21/12* (2013.01); *F15D 1/12* (2013.01);
(Continued)

(58) Field of Classification Search
CPC . F15D 1/008; F15D 1/12; F15B 21/12; B64C 2230/06; B64C 2230/04;
(Continued)

(56) References Cited

U.S. PATENT DOCUMENTS 3,001,698 A * 9/1961 Warren .................. 235/201 PF
3,182,676 A * 5/1965 Bauer ............................ 137/811
(Continued)

FOREIGN PATENT DOCUMENTS

DE 60 2006 001 040 T2 7/2009
DE 10 2010 046 667 9/2010
(Continued)

OTHER PUBLICATIONS

Chinese Office Action for Application No. 2011800570048 dated Nov. 4, 2014.
(Continued)

*Primary Examiner* — Minh Le
(74) *Attorney, Agent, or Firm* — Jenkins, Wilson, Taylor & Hunt, P.A.

(57) ABSTRACT

The invention relates to a fluid actuator for influencing the flow along a flow surface by ejection of a fluid. By means of a like fluid actuator a continuous flow is distributed to at least two outlet openings in order to generate fluid pulses out of these outlet openings. Control of this distribution takes place inside an interaction chamber supplied with fluid flow via a feed line. Into this interaction chamber there merge at least two control lines via control openings to which respective different pressures may be applied. The flow in the interaction chamber is distributed to the individual outlet openings as a function of the pressure difference at the control openings.

14 Claims, 11 Drawing Sheets

Related U.S. Application Data

(60) Provisional application No. 61/386,772, filed on Sep. 27, 2010.

(51) Int. Cl.
    *B64C 21/04*      (2006.01)
    *F15B 21/12*      (2006.01)
    *F15D 1/12*      (2006.01)

(52) U.S. Cl.
    CPC ...... *B64C 2230/04* (2013.01); *B64C 2230/06* (2013.01); *B64C 2230/18* (2013.01); *Y02T 50/166* (2013.01); *Y10T 137/218* (2015.04)

(58) Field of Classification Search
    CPC ...... B64C 2230/18; Y02T 50/166; F15C 1/22; Y10T 29/494
    USPC ....... 137/834, 833, 836, 837, 838, 839, 840, 137/841, 814, 821, 810, 819; 244/99.12
    See application file for complete search history.

(56) References Cited

U.S. PATENT DOCUMENTS

| | | | |
|---|---|---|---|
| 3,216,439 A * | 11/1965 | Manion | 137/810 |
| 3,259,096 A * | 7/1966 | Bowles | 114/151 |
| 3,306,538 A * | 2/1967 | McCracken, Jr. | 137/821 |
| 3,376,881 A * | 4/1968 | Godwin | 137/832 |
| 3,442,280 A * | 5/1969 | Boothe | 137/833 |
| 3,578,012 A * | 5/1971 | Weng | 137/827 |
| 3,691,830 A * | 9/1972 | Tomota et al. | 73/861.22 |
| 3,693,438 A * | 9/1972 | Yamasaki et al. | 73/861.22 |
| 3,719,195 A * | 3/1973 | Matsuda | 137/811 |
| 3,739,979 A * | 6/1973 | Hanada et al. | 235/201 PF |
| 3,788,141 A * | 1/1974 | Blackwell | 73/861.23 |
| 3,881,352 A * | 5/1975 | McShane | 73/861.23 |
| 3,904,514 A * | 9/1975 | Marchal et al. | 208/340 |
| 4,151,955 A * | 5/1979 | Stouffer | 239/11 |
| 4,210,283 A * | 7/1980 | Stouffer et al. | 239/11 |
| 4,291,395 A * | 9/1981 | Holmes | 367/83 |
| RE30,870 E * | 2/1982 | Inoue | 137/13 |
| 4,322,982 A * | 4/1982 | Muller et al. | 73/861.22 |
| 4,350,047 A * | 9/1982 | Dewey et al. | 73/861.22 |
| 4,562,867 A * | 1/1986 | Stouffer | 137/811 |
| 5,983,944 A * | 11/1999 | Niv | 137/831 |
| 6,263,860 B1 * | 7/2001 | Firey | 123/430 |
| 6,675,661 B1 * | 1/2004 | Peters | 73/861.22 |
| 7,080,664 B1 * | 7/2006 | Ayer | 137/832 |
| 7,128,082 B1 * | 10/2006 | Cerretelli et al. | 137/14 |
| 8,038,102 B2 * | 10/2011 | Miller et al. | 244/207 |
| 2004/0231430 A1 * | 11/2004 | Oomura et al. | 73/861.39 |
| 2006/0048829 A1 * | 3/2006 | Seifert et al. | 137/834 |
| 2007/0095032 A1 * | 5/2007 | Nilsen et al. | 55/418 |
| 2010/0084514 A1 * | 4/2010 | Miller et al. | 244/207 |
| 2010/0194142 A1 | 8/2010 | Seifert et al. | |
| 2011/0273032 A1 * | 11/2011 | Lu | 310/10 |

FOREIGN PATENT DOCUMENTS

| | | |
|---|---|---|
| DE | 10 2009 034 417 | 1/2011 |
| EP | 1 760 262 A1 | 3/2007 |
| WO | WO 79/00236 A1 | 5/1979 |
| WO | WO 2008/135967 A1 | 11/2008 |
| WO | WO 2012/041487 A1 | 4/2012 |

OTHER PUBLICATIONS

Chinese Search Report for Application No. 2011800570048 dated Oct. 28, 2014.

\* cited by examiner

FLUID ACTUATOR FOR INFLUENCING THE FLOW ALONG A FLOW SURFACE, AS WELL AS BLOW-OUT DEVICE AND FLOW BODY COMPRISING A LIKE FLUID ACTUATOR

CROSS-REFERENCE TO RELATED APPLICATIONS

This application is a continuation of and claims priority to PCT Application No. PCT/EP2011/004834, filed Sep. 27, 2011, which claims the benefit of the filing date of German Patent Application No. DE 10 2010 046 667.0 filed Sep. 27, 2010 and of U.S. Provisional Patent Application No. 61/386,772 filed Sep. 27, 2010, the disclosures of which applications are hereby incorporated by reference herein.

TECHNICAL FIELD

The invention relates to a fluid actuator for influencing the flow along a flow surface as well as a blow-out device and a flow body comprising at least one fluid actuator in accordance with the invention.

BACKGROUND

Such fluid actuators are fundamentally known for influencing the flow along a flow surface of a flow body, for example. Such fluid actuators are utilized, e.g., in order to cause flows to adhere longer along a flow body, or to reattach a flow that has separated from a flow body to the latter. This is expedient and advantageous, for example, when the known fluid actuators are employed with flow bodies having the form of adjustable flaps, control flaps, or other parts of a wing of an aircraft.

In order to reattach flows that have already separated, it is known to realize the fluid actuators in such a way that a pulse-type ejection from the openings of a fluid actuator takes place. Pulse-type ejection of fluid from the openings of a fluid actuator has the consequence of a previously detached flow being reattached to the top side of the flow body by causing the ejected fluid flow to become turbulent. In other words, energy-rich flow spaced apart from the flow body is approached to the flow body again and thus reattached to the flow body.

SUMMARY

It is an object of the present invention to resolve the drawbacks mentioned in the foregoing. In particular it is an object of the present invention to provide a fluid actuator that is capable of managing with as few mechanical components as possible, particularly as few movable components as possible, in order to reduce the costs of the fluid actuator and extend the maintenance intervals.

The above object is achieved through a fluid actuator having the features of the independent claims. Advantageous realizations result i. a. from the subclaims appended to the respective independent claims.

By the invention, a pulse-type ejection of the fluid from openings can be realized which correspond to each other, for instance pairs of openings of a fluid actuator, cooperate in such a manner that a fluid pulse and thus an abrupt outflow of the fluid, alternatingly takes place through these openings. In this way, starting out from a continuous fluid flow a distribution to two openings—i.e. a pair of openings—of a fluid actuator may take place so that an uninterrupted, continuous fluid flow may be utilized for creating a pulse-type ejection. The invention provides a solution for which valves for the distribution between the two openings of the fluid actuator are not necessary. Such valves include a multiplicity of mechanical components which must be movable for switching back and forth between the two outlet openings of the fluid actuator. Therefore, according to the invention, such mechanical components and thus the valves are correspondingly subjected to high mechanical strains in dependency on the frequency of the pulsation between the two outlet openings of the fluid body can be avoided so that maintenance and complexity of the actuator is reduced.

A fluid actuator of the invention for influencing the flow along a flow surface by ejecting a fluid flowing through the fluid actuator comprises an outlet device having at least two outlet openings as well as at least two outlet lines merging into the outlet openings. In the framework of the present invention it is also possible to provide more than two outlet openings which correspond to a corresponding larger number of outlet lines.

The fluid actuator of the invention further comprises an interaction chamber which is in respective fluid-communicating connection via a respective flow line with one respective outlet line having one respective outlet opening. Furthermore, a flow dividing device arranged at the inlet of the outlet lines is present in the interaction chamber. The flow dividing device thus serves to conduct fluid flowing from the single interaction chamber via the flow lines into the single outlet lines and thus to the individual outlet openings. The flow dividing device accordingly divides the arriving flow inside the interaction chamber and in this way distributes it into the outlet lines, to thus generate the desired pulses at the outlet openings.

In addition, in a fluid actuator of the invention a feed line is provided which is realized for supplying fluid at a feed pressure into the interaction chamber. The feed line may receive pressurized air, for instance from external devices such as the engine of an aircraft, and conduct it into the interaction chamber. This feed pressure corresponds to a substantially continuous fluid flow which flows into the interaction chamber via the feed line. This substantially continuous flow from the feed line is divided by the flow dividing device inside the interaction chamber, so that starting out from an individual fluid flow a distribution to the plurality of the outlet lines and thus to the plurality of the outlet openings takes place.

In a fluid actuator of the invention at least two control lines for supplying fluid at respective different control pressures into the interaction chamber via at least one respective control opening are furthermore present. The control lines merge into the respective control opening and thus into the interaction chamber. A different control pressure, i.e., a corresponding static pressure of the flow that is present in the control line accordingly prevails at each control opening. These different control pressures serve—as will be described hereinbelow—the interaction with the fluid flow from the feed line into the interaction chamber in order to perform the distribution by means of the flow dividing device inside the interaction chamber.

For the purpose of this distribution, the interaction chamber of a fluid actuator of the invention is configured such that when fluid is supplied via the control line at respective, alternatingly different control pressures at the control openings, the fluid flowing through the feed line is correspondingly deflected, inside the interaction chamber, alternatingly majoritarily into a respective outlet line. In other words, the interaction chamber is realized such that owing to alternating differences in the control pressures at the control openings, different outlet lines are supplied via the flow lines with fluid flow from the feed line, and thus the outlet opening connected in fluid-communicating manner to the respective outlet opening is supplied with a fluid pulse. In other words, the alternation of the different control pressure at the control openings inside the interaction chamber corresponds to the alternating distribution of the fluid of the flow from the feed line into the interaction chamber and thus to the alternating discharge of fluid pulses from the respective outlet opening of the outlet device. The alternating discharge and the previously mentioned requirements, i.e. particularly the alternation of the control pressures, may take place periodically, i.e. at an oscillating frequency. It is, however, also possible for the pulses from the outlet openings and thus also the pulses of the control pressures to be generated in an irregular manner.

Advantageously a minimum of mechanical parts is utilized in a fluid actuator of the invention in order to generate the different control pressures. In particularly simple embodiments of the present invention no mechanical components are required at all. To this end, a fluid actuator of the invention comprises a control pressure varying device which is equipped with a control feed line and a control flow dividing device. The control flow dividing device is in fluid-communicating connection with the control feed line and with the control lines and is thus capable of distributing the flow from the control feed line to the control lines.

For the purpose of this distribution, a flow body is arranged in the control feed line. This flow body is equipped in such a way that when a flow is applied by the control feed line by way of an enveloping flow around the flow body, vortices are shed from the latter transversely to the direction of flow. When the flow body—which is arranged immovably, i.e. in a substantially immobilized manner in the control feed line—is viewed in its cross-section and the direction of flow in the feed line in such a cross-section is defined from left to right, the arriving fluid will therefore impinge on the flow body from the left and flow around it at the top and bottom. When viewed transversely to this direction of flow, i.e. top and bottom in this manner of viewing the flow body, the vortices accordingly detach from the flow body on account of its shape. Depending on the kind of the fluid, particularly depending on its viscosity, and depending on the velocity of the fluid flow, vortex shedding on the flow body relative to the direction of flow will take place sooner or later. What is in particular expedient in such an arrangement are pulsation bodies which form a so-called Kármán vortex street when a fluid flows around them. Here a large variety of different shapes of the flow body are conceivable. The individual shapes will be discussed in more detail later on.

Because of the alternating shedding of vortices on the two sides of the flow body, the flow from the control feed line is alternatingly distributed majoritarily into a respective one of the control lines in order to generate the alternatingly different control pressures. Here it should be noted in the framework of the present invention that the "majority" distribution both in the case of the control pressures and in the case of the flow lines, or the outlet lines, a distribution with more than 50% to the corresponding line is sufficient in order to meet this fundamental definition of the present invention. Particularly in the case of the control lines and in regard of the applied control pressures at the control openings, even slight differences in the control pressure at the respective control openings are sufficient in order to subsequently, inside the interaction chamber, distribute the arriving flow of fluid from the feed line alternatingly and majoritarily to the outlet lines in accordance with the invention. In other words, it is sufficient if the flow body in its operating condition generates, due to the alternating shedding of vortices, an imbalance in the distribution of the uniform flow from the control feed line to the control lines leading to the control openings. Here it is possible for a distribution of 51:49 to take place in an extreme case, but in the other extreme case a distribution of 99:1. Even complete apportioning to one of the two control lines is conceivable albeit not indispensable. The minimum distribution of an alternating majoritary distribution to the flow lines, or the control lines, may advantageously also be realized more distinctly. Thus it is possible, for example, for the majoritary distribution to presuppose a distribution ratio of at least 55:45, particularly of at least 60:40, or of at least 65:35. In this way the efficiency of a control of the pulses by way of the distribution at the control lines, or the very pulses at the outlet openings may be enhanced.

In this way the shedding of vortices at the flow body thus generates a distribution to the respective control line in an alternating majoritary manner without any mechanically movable component, while this distribution is dependent on the flow velocity at the flow body. Particularly when a so-called Kármán vortex street forms at the flow body, the shedding of vortices takes place in an oscillating manner, or in an alternatingly periodical manner. In other words, the flow will alternatingly separate on the one side and on the other side of the flow body and generate a respective oppositely directed vortex at a defined frequency that is predetermined by the parameters of the surroundings. Aside from the geometry of the flow body, the periodicity and thus the frequency of vortex shedding also depends on the flow velocity of the flow around the flow body and on the kind of the flowing fluid. In other words, varying the flow velocity in the control feed line allows to vary the velocity of the enveloping flow on the flow body and in this way vary the pulsation frequency in the control feed line. In this way a simple variation of the volume flow rate allows to obtain a variation of the separation frequency on the flow body and thus indirectly also a variation of the pulsation frequency at the outlet openings of the fluid actuator. The present invention thus not only fundamentally provides a fluid actuator for the pulsating discharge of fluid but even a controllable fluid actuator without a necessity of movable components.

The control feed line is equally supplied with a defined pressurized air which may be supplied, e.g., by the same organ for the generation of pressurized air as the feed line into the interaction chamber. In this case, as well, it may be air tapped from an engine of an aircraft by way of example. However it is sufficient for the control pressure if clearly lower pressures are involved, i.e. clearly lower volume flow rates and thus also clearly smaller line cross-sections. In other words a bistable actuator is formed in this way, or a multistable fluid actuator in cases of more than two outlet openings of the fluid actuator. The preferred Reynolds numbers, i.e. the preferred ranges in regard of viscosity and flow velocity at the flow body, are between 30 and 200 for the laminar flow range and even above a Reynolds number of greater than 200 in the turbulent range.

The entire apparatus, i.e. the entire fluid actuator, is preferably realized to be substantially symmetrical. Irrespective of possible manufacturing tolerances, this symmetry relates to a central axis defining a longitudinal axis of the fluid actuator. However depending on the location of use, particularly the geometrical circumstances at the location of use, more complex configurations of the fluid actuator, particularly physical separations of the outlet device, of the interaction chamber and of the control pressure varying device are also conceivable. The intersections of these individual devices may be realized with different lengths as they may be routed flexibly via fluid-communicating connections having the form of tubes constituting the control line, the control feed line, the feed line and/or the flow line. The pulsation bodies may also advantageously be symmetrical and may have, e.g., a round cross-section but also a polygonal cross-section, for example a triangular or trapezoidal cross-section.

A fluid actuator of the invention may be developed further to the effect that at least one portion of the side of the flow body impinged on by the fluid flow from the control feed line is curved, to thus cause the formation of a Kármán vortex street. The partial curvature may, for example, have a cross-section in a D shape, wherein the curvature in the direction of the impinged side of the flow body may be both constant, i.e. curved along a circle line, and may also exhibit different degrees of curvature. Even a substantially circular cross-section is conceivable, which will lead to the formation of a flow body having, e.g., the shape of a cylinder. Variable circular cross-sections varying along the longitudinal axis of such a cylinder are equally possible, in which case a barrel shape of the flow body will result. Basically, however, and independently of the actual geometry of the flow body, it is decisive for the present invention that alternating shedding of vortices takes place on the flow body when it is enveloped by a flow.

It may furthermore be advantageous in a fluid actuator of the invention if the interaction chamber has convexly curved walls when viewed in the direction of the outlet lines from the interior of the interaction chamber. Applying the flow to a respective one of these walls may then result in a stable flow along this wall into the respective outlet line if the lowest control pressure of all the control lines prevails in the control line merging at the respective wall. Such convexly curved walls are in particular Coanda walls which form a Coanda flow along that wall. The Coanda flow is characterized by the fact that once a flow has been applied to such a wall, it flows stably along the latter until a deflection of the flow, i.e. a separation of the applied flow from that wall is actively produced. It is therefore sufficient if small and/or temporally short variations of the control pressure difference, particularly at alternating control pressure difference directions, forcibly bring about a sudden changeover of the main flow from the feed line into the other outlet line, along the opposite wall. Another advantage of walls curved in this manner is that the proportion of the flow conducted into the subsequent outlet line rises. While the fundamental presence of a minimum pressure difference is sufficient in the case of the control lines, it may be advantageous for the purpose of increasing the efficiency of the fluid actuator if a largest possible proportion of the fluid flow is conducted from the feed line into a respective one of the outlet lines so that the main part of the flow is output from one of the outlet openings during a pulse phase while substantially hardly any or no fluid at all flows out from the other outlet opening(s). In other words, a distribution of more than 80, particularly more than 85, in a preferred manner more than 90% to a single outlet line and thus to a single outlet opening is advantageous. In this way greater pulse differences are created between the outlet openings, so that the effect of the pulsation and thus the effect of influencing the flow by means of the fluid actuator of the present invention is optimized.

It may also be advantageous in a fluid actuator of the invention if the control feed line of the control pressure varying device has convexly curved walls when viewed in the direction of the control lines from the interior of the control feed line. In this way the application of the flow to a respective one of the walls results, in the same manner as described in the foregoing for the interaction chamber, in the formation of a stable flow along this wall into the respective control line if a control line situated in continuation of this wall is supplied with flow by the alternatingly majoritarily distributed flow from the control feed line. This curved wall is in particular a Coanda wall, with the flow generated along this wall accordingly being a Coanda flow in the control pressure varying device. In this way it is possible even with a low pulsation distribution at the flow body to majoritarily distribute relatively large proportions of the arriving flow from the control feed line to one of the control lines, so that even with a low total volume flow rate from the control feed line a relatively large control pressure may be generated at one control line and a correspondingly lower control pressure at the other control line. In this way it is possible even with a relatively low volume flow rate from the control feed line to generate a sufficient relative pressure between the individual control pressures at the control openings.

Furthermore it may be advantageous in a fluid actuator of the invention if at least two pulsation assisting bodies are arranged in the control feed line downstream from the flow body in the direction of flow. Furthermore at least three control lines are provided side by side when viewed in the longitudinal direction of the control feed line, which alternatingly majoritarily receive fluid from the control feed line by means of the flow body and the pulsation assisting bodies into one of the three control feed lines. The pulsation assisting bodies have a configuration similar to, or identical with, the one of the flow body. In particular, alternating vortex shedding will also take place in the case of the pulsation assisting bodies to thus result in a periodically alternating separation of the flow around the pulsation assisting body. A cascade of flow body and pulsation assisting bodies is hereby provided which allows a distribution in two steps, or in several steps if the cascade is extended by additional rows of pulsation assisting bodies.

The flow body alternatingly, in particular periodically distributes to the two pulsation assisting bodies, while the respective alternatingly, in particular periodically impinged pulsation assisting bodies in turn distribute the fluid flow alternatingly, in particular periodically to the control lines arranged downstream from them. In particular the geometry of the pulsation assisting bodies is selected such that the pulsation frequency of the pulsation assisting bodies is higher than the pulsation frequency of the flow body at a same flow velocity of the flow around the respective body. In particular, at a same flow velocity the pulsation frequency at the pulsation assisting bodies is substantially twice as high as the pulsation frequency at the flow body, so that for each distribution phase, i.e. for each half period at the first flow body to one of the two pulsation assisting bodies, two distribution phases, i.e. a complete period, to the one, or to the second control line, may take place at this pulsation assisting body. As the result of a further vortex shedding at the flow body, the flow subsequently changes over to the other pulsation assisting body which distributes during the second half of the period of the flow body both once to the one control line as well as once to the second control line. In this way a distribution to more than two control lines is possible in accordance with the invention without having to utilize mechanical components, particularly mechanically movable ones.

It may moreover be advantageous in a fluid actuator of the invention if at least one throttle valve for changing the flow velocity of the flow in the control feed line and thus of the fluid flowing around the flow body is arranged in the feed line. Such a throttle valve serves to reduce the velocity of the flow in the control feed line. Particularly at constant volume flow rates due to the tapped air of an engine, for example, it is possible in this way to adjust with the aid of the throttle valve from a maximum input velocity to a defined flow velocity in the control feed line.

As was already discussed in detail in the foregoing, the pulsation frequency at the flow body and thus the ejection frequency at the outlet openings of the fluid actuator of the invention depends on the flow velocity in the control feed line and thus on the flow velocity of the fluid flowing along the flow body. In other words, in this way it is possible to vary the pulsation frequency in a particularly simple manner with the aid of the throttle valve. When the opening of the throttle valve is reduced, the flow velocity is reduced and the pulsation frequency at the flow body drops, whereby the pulsation frequency at the outlet openings also drops. When the opening of the throttle valve is increased, the flow velocity in the control feed line increases and the pulsation frequency at the flow body rises. The pulsation frequency at the outlet openings of the fluid actuator of the invention consequently also rises. When a multiplicity of fluid actuators is provided in a flow body, the throttle valve may also be adjusted fixedly for each fluid actuator. For example, the throttle valve may be constituted by an orifice which decelerates an incoming volume flow to a certain percentage of its arriving flow velocity. When a multiplicity of fluid actuators of the present invention is provided it is possible in this way to adjust a pulse frequency profile in a particularly simple manner and in the absence of any mechanically movable component through the profile of the fluid actuators of the invention, particularly if the throttle valve is realized as a orifice. For each fluid actuator a separate pulsation frequency is preadjusted by way of the orifice opening, i.e. by way of the degree of opening of the throttle valve. When the overall pressure of the supply is increased, the pulsation frequency at each individual fluid actuator rises, however the relative ratio between the pulsation frequencies of the individual fluid actuators is preserved. Thus it is possible to inventively preadjust pulsation frequency profiles in a particularly simple manner by a multiplicity of fluid actuators of the invention.

Another subject matter of the present invention is a blow-out device comprising at least one fluid actuator of the invention. In such a blow-out device a pressurized air supply device is furthermore provided which comprises a control supply line connected to the control feed line in fluid-communicating connection and/or comprises a supply line connected to the feed line in fluid-communicating connection. The pressurized air supply device may, for example, be a connection to the engine of an aircraft from which tapped air is conducted via the supply line or the control supply line to the feed line or to the control feed line, respectively. In more simple realizations it is, however, also possible for the pressurized air supply device to be a simple opening on a flow body which serves as an air inlet and thus receives an enveloping flow of the flow body, to serve in this manner as a pressurized air supply device. When used for flow bodies and for influencing the flow at the top side of such flow bodies, such an opening may be arranged, e.g., at the bottom side of a flow body. In such a variant the provision of a throttle valve, particularly a variable throttle valve is advantageous, for different admission pressures in the respective supply line have to be expected owing to changes in air pressure or changes of speed of the aircraft.

It may be advantageous in a blow-out device of the invention if a throttle valve for influencing the flow velocity in the control supply line and/or in the supply line is arranged in the control supply line and/or the supply line. Such a throttle valve is expedient particularly if fluctuations in the pressurized air supply from the pressurized air supply device are to be expected. In this way the pulsation at the outlet openings, or the pulsation frequency controlled by the control feed line and the flow velocity prevailing in the latter is prevented from varying in an uncontrolled manner. In other words, in the event of an overabundance of pressurized air from the pressurized air supply device, the throttle valves serve the purpose of adjusting the corresponding flow velocity necessary for the desired operation, particularly the optimum operation of the fluid actuator of the invention. In the event of a very large overabundance of pressurized air from the pressurized air supply device, mechanical damage to the fluid actuator or even a mechanical destruction thereof is also prevented in this manner.

It may furthermore be advantageous in a blow-out device of the invention if a compressor for influencing the flow velocity in the control supply line and/or the supply line is arranged in the control supply line and/or the supply line. The compressor has the opposite effect of the throttle valve. It serves not to throttle, i.e. reduce the flow velocity but to increase the flow velocity in the respective supply line. In particular in low-speed flight situations of an aircraft, or for instance in the cruising flight of an aircraft in the presence of low external pressure due to great heights, it may be advantageous to assist the pressurized air generation having the form of an opening on the bottom side of a flow body if it provides insufficient pressurized air. Here an interaction of throttle valve and compressor allows for the highest variability in a blow-out device of the invention, for both a deceleration of the flow as well as an acceleration of the flow become possible. In this way a substantially continuous flow profile may be obtained both in the control supply line and in the supply line, and thus in the control feed line as well as in the feed line. Accordingly it is possible to also obtain a continuous operation of the pulsation and thus a substantially unambiguously defined functioning of the fluid actuator of the invention.

It is, of course, also conceivable for more than one fluid actuator to be arranged in the blow-out device of the invention. In particular at least two fluid actuators of the present invention are provided, and the control supply line is in fluid-communicating connection with the control feed lines of the fluid actuators and/or the supply line is in fluid-communicating connection with the feed lines of the fluid actuators. In other words, the supply line and/or the control supply line are central supply lines for all of the fluid actuators. This considerably reduces the complexity and the installation expenditure for a blow-out device of the invention. Only the connections to the respective supply device need to be provided for each fluid actuator. If, for instance, a multiplicity of fluid actuators of the invention are to be distributed over the wing span direction of a wing of an aircraft, there is no need for an individual connection of each fluid actuator. It is rather sufficient if one respective supply line for the control pressure varying device and the interaction chamber is routed along the wing span direction of the wing. In each desired location of a fluid actuator of the invention, connections are provided on the supply line, or on the control supply line, whereby the respective fluid actuator may be taken into fluid-communicating connection.

Such an embodiment may be simplified further if the control supply line and the supply line in a blow-out device of the invention are constituted by a common supply line. In other words, the entire supply line in the wing span direction is reduced to a single line providing pressurized air for all of the components of all fluid actuators. At least two lines for each fluid actuator thus branch off from this single line which lead on the one hand via the feed line into the interaction chamber and on the other hand via the control feed line into the control pressure varying device. In this way it is ensured in a particularly simple manner that a low-cost and easily installed distribution across the wing span direction of a wing of an aircraft takes place, with the inventive functionality of a fluid actuator of the invention nevertheless being ensured in each position for each fluid actuator of the invention.

In such an embodiment it is particularly advantageous if a throttle valve is furthermore provided at least in the control feed line and/or a compressor in the feed line for the interaction chamber. In the feed line a clearly higher pressure or higher volume flow rate is typically required in order to generate the necessary volume flow rates of the volume pulses at the outlet openings than is the case in the control feed line for the control of the interaction chamber. If a common line is used, a variation of the necessary volume flow rates may take place in that each fluid actuator of the invention throttles the arriving high admission pressure, or the high volume flow rate, in its control feed line in order to arrive at a necessary maximum measure for the velocity in the control pressure varying device. Alternatively it is also possible to increase the velocity in the feed line or the pressure by means of the compressor in the feed line into the interaction chamber. A combination of a throttle valve in the control feed line and a compressor in the feed line into the interaction chamber are, of course, also conceivable in accordance with the present invention.

Another subject matter of the present invention is a flow body comprising a plurality of outlet openings and at least one fluid actuator of the invention or at least one blow-out device of the invention. Thus, for example, the flow body may be the main wing of an aircraft and the outlet openings may be provided on the trailing edge relative to the direction of flow upstream from subsequent control flaps at the main wing. Even outlet openings of a fluid actuator of the invention on the very control flaps are conceivable in order to stabilize flow present there, or to reattach to the control flaps a flow having already separated in this area.

With a blow-out device of the invention or with a fluid actuator of the invention it is thus possible to form a flow body of the invention that is optimized in regard of its aerodynamic properties. This optimization also relates to convexities of the wing where flows would otherwise separate, or to long extending paths of control flaps. As the corresponding flow is assisted by a fluid actuator of the invention, the aerodynamic efficiency may be enhanced to thereby reduce, for example, weight and size and thus also the drag of the control flaps or of a wing, respectively. Fluid actuators of the invention or blow-out devices of the invention thus contribute to an optimized flow body which optimizes an aircraft in terms of its efficiency.

BRIEF DESCRIPTION OF THE DRAWINGS

The present invention shall be explained in more detail by referring to the annexed figures of the drawings. Here the expressions "left", "right", "top" and "bottom" refer to an orientation of the figures of the drawings where reference symbols are legible in a normal manner.

DETAILED DESCRIPTION

Figure 1:
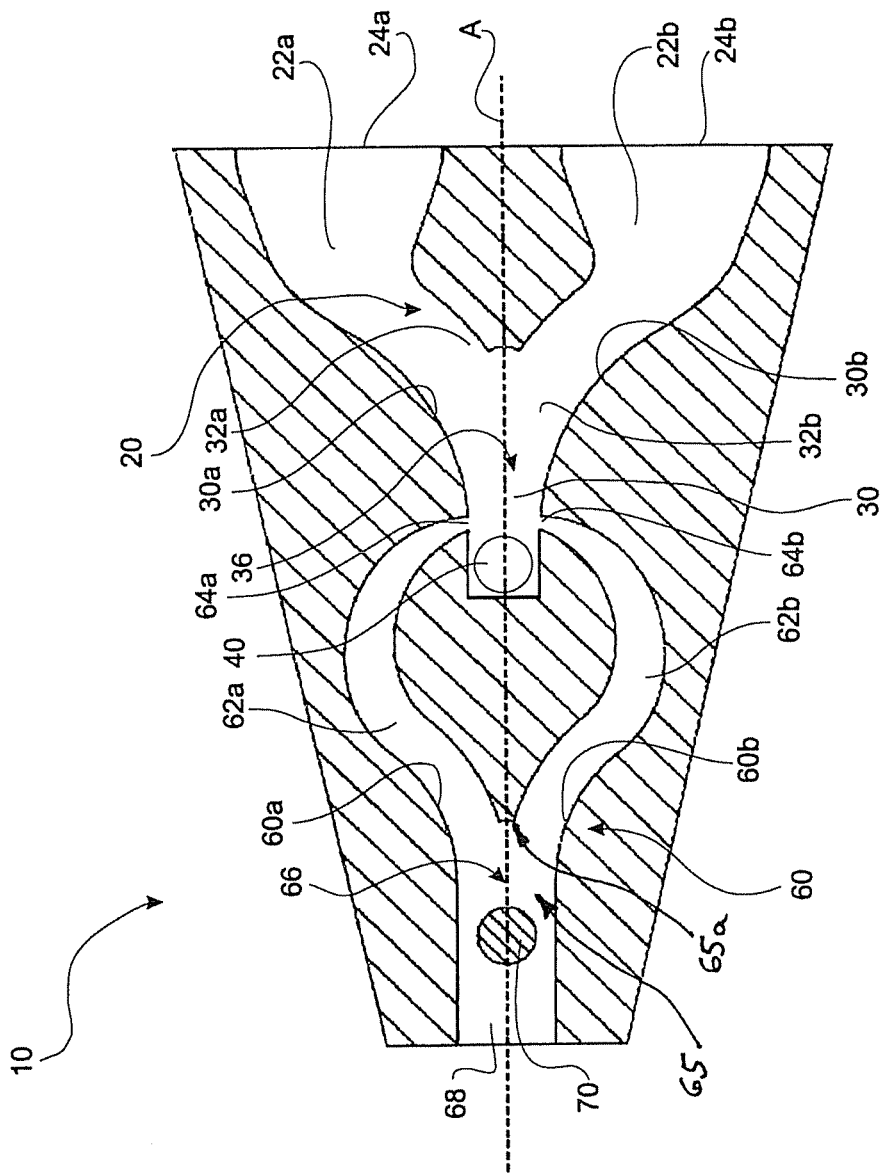
FIG. 1 is a cross-sectional view of an embodiment of a fluid actuator of the invention

FIG. 1 is a cross-sectional view of a first embodiment of a fluid actuator of the invention 10. This fluid actuator 10 is constructed substantially symmetrically in symmetry relative to an axis A. The fluid actuator 10 of the embodiment of FIG. 1 comprises an outlet device 20 having two outlet openings 24a and 24b. The fluid actuator 10 of this embodiment thus serves to obtain a pulsation by distributing a fluid flow between the two outlet openings 24a and 24b.

In order to distribute the air to the two air outlet openings 24a and 24b, a feed line 40 is arranged in the fluid actuator 10 of FIG. 1 which introduces air, and thus flowing fluid, into a interaction chamber or connecting chamber 30. Inside the interaction chamber a flow division is performed, i.e. the supplied fluid flow from the feed line 40 is alternatingly distributed majoritarily to one of the two outlet lines 22a and 22b, as will be described later on. To this end the interaction chamber 30 comprises two flow lines 32a and 32b which are in fluid-communicating connection with the outlet lines 22a and 22b and via the latter with the outlet openings 24a and 24b. In other words, the fluid flow from the feed line 40 is alternatingly conducted majoritarily once via the upper control line 30a into the upper outlet line 22a and thus into the upper outlet line 24a. Following termination of the first pulse through this outlet opening 24a, the flow dividing device 36 changes the distribution of the fluid flow, so that the fluid flow from the feed line 40 is diverted and flows via the lower flow line 32b into the lower outlet line 22b, to exit from the lower outlet opening 24b. When this second pulse is terminated, this process starts anew.

The diversion or switching over between the two flow lines 32a and 32b and thus switching over between the two outlet lines 22a and 22b or the outlet openings 24a and 24b takes place in accordance with the following description.

Two control lines 62a and 62b merge into the interaction chamber 30 via control openings 64a and 64b. If respective different control pressures are applied to these control openings 64a and 64b, then the flow in the interaction chamber 30 that is provided by the feed line 40 follows the side of the interaction chamber 30 presenting the control opening 64a or 64b having the relatively lower control pressure. In other words, there exists a control pressure difference or a pressure gradient between the two control openings 64a and 64b, which results in the fluid flow from the feed line 40 being given a direction. If the lower control pressure is present at the lower control opening 64b, then the fluid flow from the feed line 40 is majoritarily conducted into the lower flow line 32b and thus into the lower outlet line 22b so as to exit from the lower outlet opening 24b. If, in contrast, the lower control pressure is applied at the control opening 64a above inside the interaction chamber 30, then the flow from the feed line 40 follows the upper flow line 32a into the upper outlet line 22a so as to exit from the upper outlet opening 24a. This functionality results from the vector addition between the flow vector of the flow from the feed line 40 and the flow vector of the flow from the control opening 64a or 64b having the higher control pressure. The resulting vectorial sum expresses, as it were, the flow from the feed line 40 on the opposite side of the interaction chamber 40.

In order to establish the control pressure difference between the two control openings 64a and 64b, particularly the changeover of this control pressure difference, a control pressure varying device 60 is arranged to the left of the interaction chamber 30 in FIG. 1. This control pressure varying device 60 comprises a control feed line 68 whereby the control pressure varying device 60 is supplied with flowing fluid. Furthermore, a control flow dividing device 66 in form of a section of the control feed line 68 is provided in the control pressure varying device 60 which alternatingly distributes the arriving fluid flow from the control feed line 68 majoritarily to one of the two control lines 62a and 62b. As a result of this distribution, once the upper control line 62a and thus the upper control opening 64a and subsequently the lower control line 62b and thus the lower control opening 64b is subjected to the greater proportion from the arriving fluid flow of the control feed line 68, so that the higher pressure, particularly the higher static pressure forms once in the control line 62a and once in the control line 62b, depending on which one of the two is subjected to the greater proportion of the fluid flow from the control feed line 68. In the opening of the corresponding control line 62a or 62b, i.e. in the corresponding control opening 64a and 64b, a correspondingly higher pressure then prevails which influences the main flow from the feed line 40—as was described further above—to flow into the one or the other flow line 32a or 32b.

In order to be able to perform the distribution of the arriving fluid flow from the control feed line 68, a flow body 70 is arranged in the control pressure varying device 60. The flow body has the function of a bluff body or pulsation body and is integrated in the actuator for creating vortices before and in the area of the inlets of lines 62a, 62b. This flow body configured such that when a flow is present through the control feed line 68 by flowing around the flow body 70 when viewed from the latter transversely to the direction of flow, i.e. above and below the flow body 70 in FIG. 1, vortices are alternatingly shed from the latter in a section 65 of line 68 behind the flow body. The section 65 comprises a branching point or branching area 65a from which the walls of lines 62a, 62b, which are lying next to each other and are directed opposite to each other, branch from line 68 and from each other. According to an embodiment of the invention, the distance between the very back point of the flow body 70, when seen in the direction of axis A or in the flow direction, and the branching point 65a is between one time until five times the size of the largest diameter of the flow body 70 when seen in a plane on which axis A or the longitudinal direction of the line 68 stands perpendicular. Alternatively or in addition, the cross-sectional area of the flow body 70 in a plane, on which axis A or the longitudinal direction of the line 68 stands perpendicular, is by factor 0.2 to 0.8 smaller that the cross-sectional area of the flow body 70 in the same plane in which the volume center of the flow body is positioned.

Depending on the side on which vortex shedding occurs, such vortex shedding alternatingly urges the enveloping flow around the flow body 70 once into the upper control line 62a, and in the event of vortex shedding on the opposite side into the other control line 62b. In most cases the flow body 70 will be a body that forms a so-called Kármán vortex street in wide ranges of the Reynolds numbers both in the laminar and turbulent ranges. This means that vortices are shed in a periodically alternating manner on two sides, i.e. at the top and bottom in FIG. 1 at the flow body, so that periodically once the upper control line 62a and subsequently the lower control line 62b is subjected to the greater proportion of the arriving fluid flow from the control feed line 68. Due to the alternating, in particular periodically alternating shedding of vortices at the flow body 70, the higher pressure will in this manner alternatingly prevail at a same periodicity and thus a same frequency at the control openings 64a and 64b. Due to the respective alternatingly higher prevailing pressure, the main flow from the feed line 40 is furthermore distributed majoritarily at the same frequency and thus the same periodicity through the changing pressure difference to the control openings 64a and 64b, once to the lower flow line 32b and subsequently to the upper flow line 32a. The pulsation frequency at the flow body 70 thus substantially defines the pulsation frequency at which the fluid flow from the feed line 40 alternatingly distributes itself to the two outlet openings 24a and 24b, and thus the pulse frequency of the latter.

The flow body 70 is represented in cross-section in FIG. 1. The formation of the flow body 70 is, however, not restricted to a substantially round cross-section. In addition, a round cross-section may signify different shapes in three dimensions. As regards possible shapes for the flow body 70, reference shall here be made to FIGS. 10a to 10f and the following corresponding description.

Figure 10C:
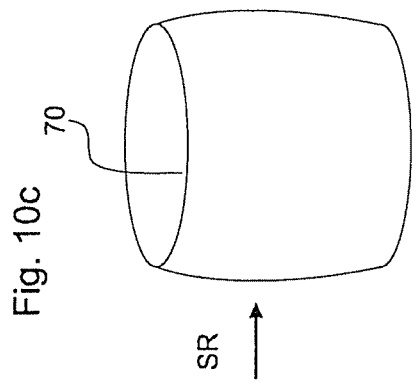
FIGS. 10a to 10f show different embodiments of pulsation bodies of the invention.
Figure 10F:
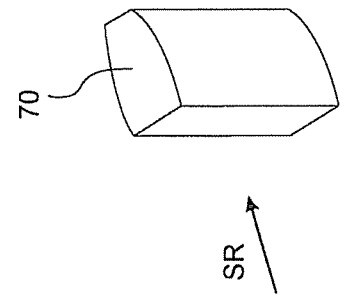
Figure 10B:
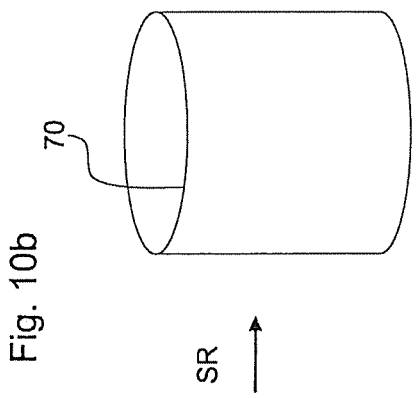
Figure 10E:
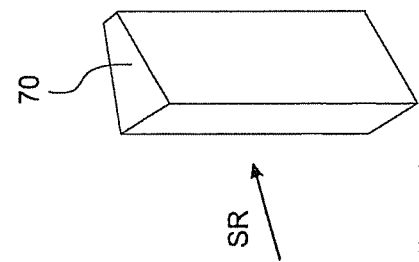
Figure 10A:
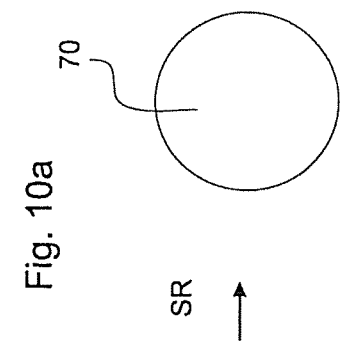

FIGS. 10a to 10c show possible pulsation bodies 70 having a round cross-section. FIG. 10a shows a sphere that may be employed in the control pressure varying device 60. In all of FIGS. 10a to 10f, SR indicates the directions of impinging flow and thus the definition of the side of attack of the flow body 70.

FIG. 10b shows a cylindrical realization of a flow body 70, wherein the generated cylinder surface is impinged by the fluid flow in the direction of flow SR. Along the generated surface—depending on the velocity of the flow around the flow body 70—a vortex will sooner or later detach from the flow body 70 on the side facing away from the flow, alternatingly at the top or bottom in FIG. 1 are in the front and back in FIG. 10b.

FIG. 10c shows a substantially barrel-shaped three-dimensional realization, with this flow body 70 equally presenting a round cross-section.

Figure 10D:
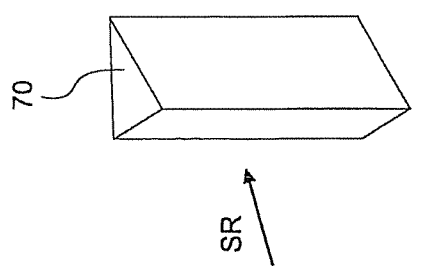

FIG. 10d shows a variation of the flow body 70 which does not present a round cross-section. Here the cross-section is substantially triangular, with the shortest area of the triangle, in this case an isosceles triangle, being made to face the direction of flow SR. The embodiment of FIG. 10d may be modified by truncating the tip of the triangle, as is represented in FIG. 10e. This results in a flow body 70 having in its cross-section particularly a substantially equilateral trapeze. Here too, one of the side faces, being an impinged face, is directed against the direction of flow SR. In FIG. 10f the shape of FIG. 10d is modified further, with the two side faces having a curved configuration. The flow body 70 of such an embodiment is particularly easy to configure and reduces drag in comparison with the embodiments in FIGS. 10d and 10e. Shedding of the vortices in the shapes of FIGS. 10e and 10f will in the most frequent cases take place at the ends of the two side faces which in this way form separation edges, as it were.

Furthermore, specialized realizations of the walls in the control lines 62a and 62b and in the flow lines 32a and 32b may be seen in FIG. 1. The walls of the control pressure varying device 60 are realized as convexly curved walls 60a and 60b. As a result of this convex curvature, a flow applied by periodical vortex shedding to the flow body 70 at the one wall 60a or the other wall 60b stably attaches itself to the corresponding wall 60a or 60b. This formation of the respective wall 60a and 60b thus stabilizes the flow applied in this manner.

The convexly curved realization of the walls 30a and 30b of the interaction chamber 30 operates likewise. In this case the application is, however, not effected by a flow body 70 but by the pressure difference at the control openings 64a and 64b. The smaller pressure difference between the control openings 64a and 64b in a sense urges the arriving fluid flow from the feed line 40 once onto the one wall 30a and once onto the other wall 30b. Having been applied to the respective wall 30a or 30b, the flow stabilizes itself along the convex curvature of the wall 30a or 30b and is thus majoritarily conducted into the corresponding flow line 32a and 32b. In other words, both in the control pressure varying device 60 and in the interaction chamber 30 the stabilization of the respective applied and deflected flow may be effected by correspondingly realized walls 60a, 60b, 30a and 30b, whereby the proportion of the distribution to the respective preferred control line 62a or 62b or the respective preferred flow line 32a or 32b may be increased.

Figure 2A:
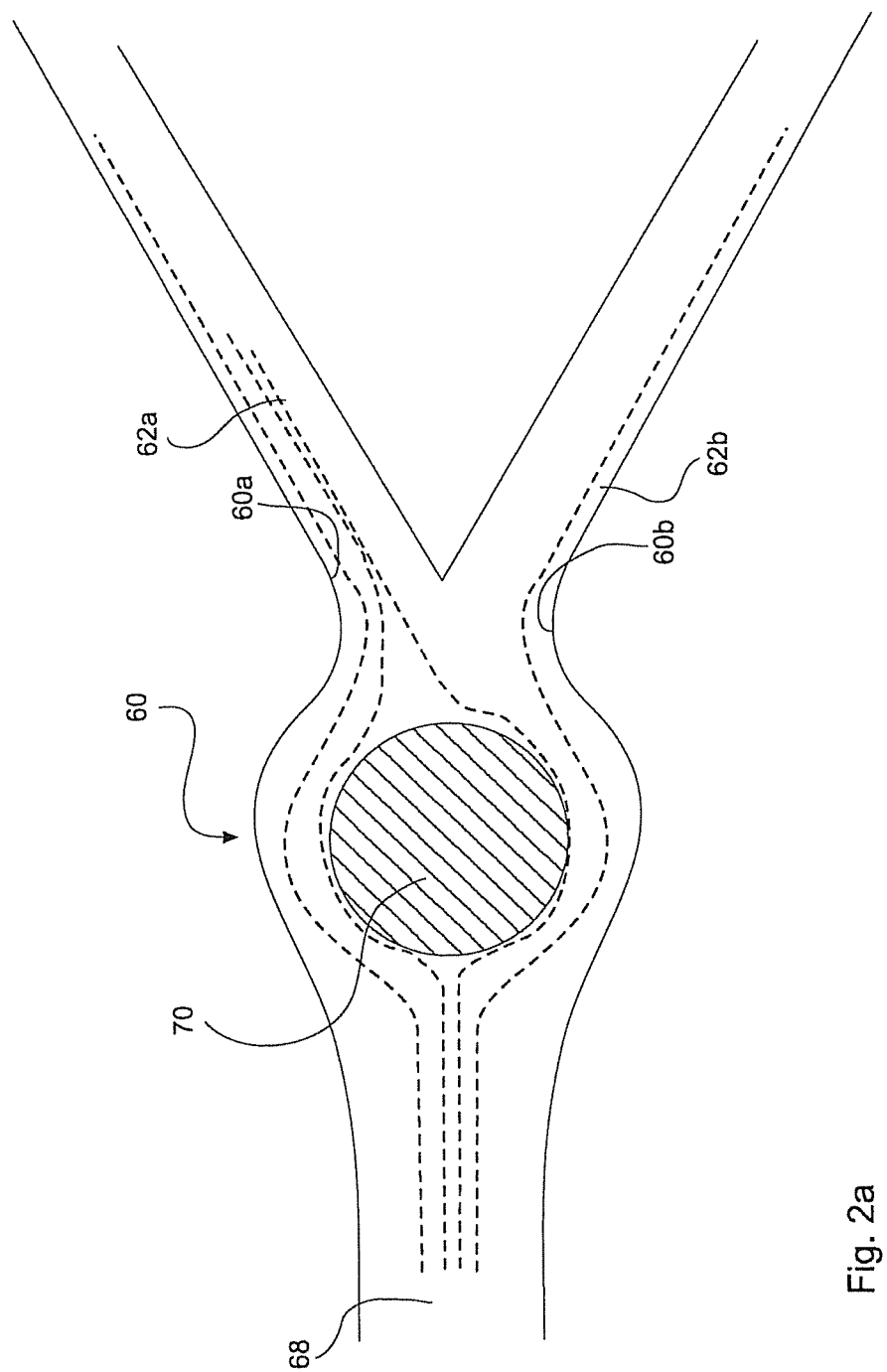
FIG. 2a shows a detail of an embodiment of a control pressure varying device of the invention in a first state
Figure 2B:
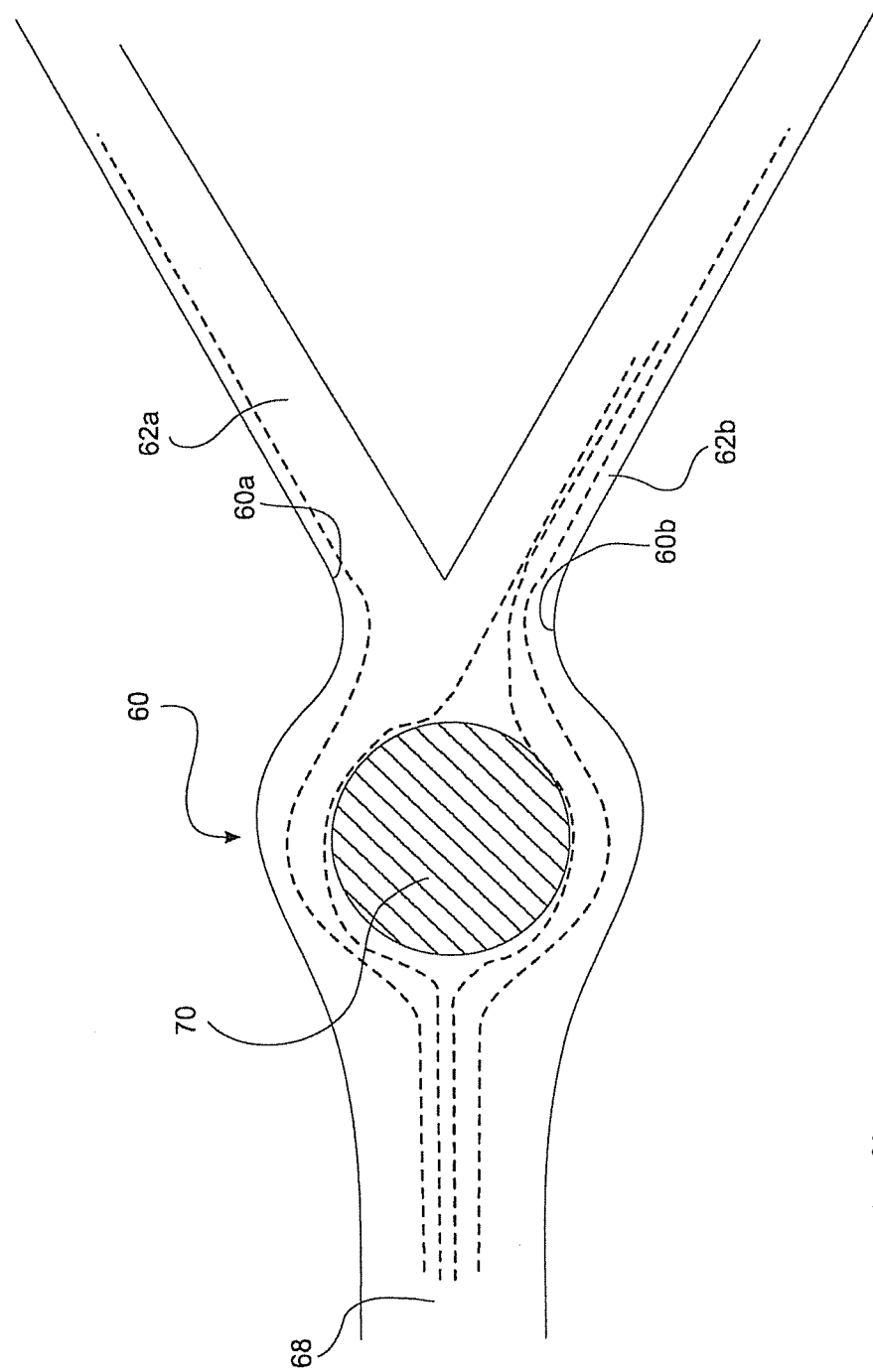
FIG. 2b shows the control pressure varying device of FIG. 2a in another flow state

FIGS. 2a and 2b show by way of example that it is sufficient if only a majoritary irregular distribution and not a complete distribution of the arriving flow from the control feed line 68 is effected by the flow body 70 to the two control lines 62a and 62b. The two FIGS. 2a and 2b show the two different halves of a periodicity phase around the flow body 70. In FIG. 2a the situation is represented in which vortex shedding on one of the two sides of the flow body 70 in the example of FIG. 2a guides three of four lines of flow into the upper control line 62a along the curved wall 60a. If subsequently another vortex detaches itself on the opposite side of the flow body 70, then the lines of flow change and three of four lines of flow are taken—as represented in FIG. 2b—into the lower control line 62b via the lower wall 60b. Depending on the realization of the walls 60a and 60b and depending on the velocity around the flow body 70 and the geometrical realization thereof, a differently strong distribution to the two control lines 62a and 62b accordingly takes place. For the operation of the invention it is, however, sufficient if fundamentally a non-uniform distribution takes place, i.e. if more than 50%, particularly more than 55% or more than 60% of the flow from the control feed line 68 is introduced into one of the two control lines 62a or 62b for each periodicity phase. In this way there results the pressure difference required for generating the pulsation in the interaction chamber 30.

Figure 3:
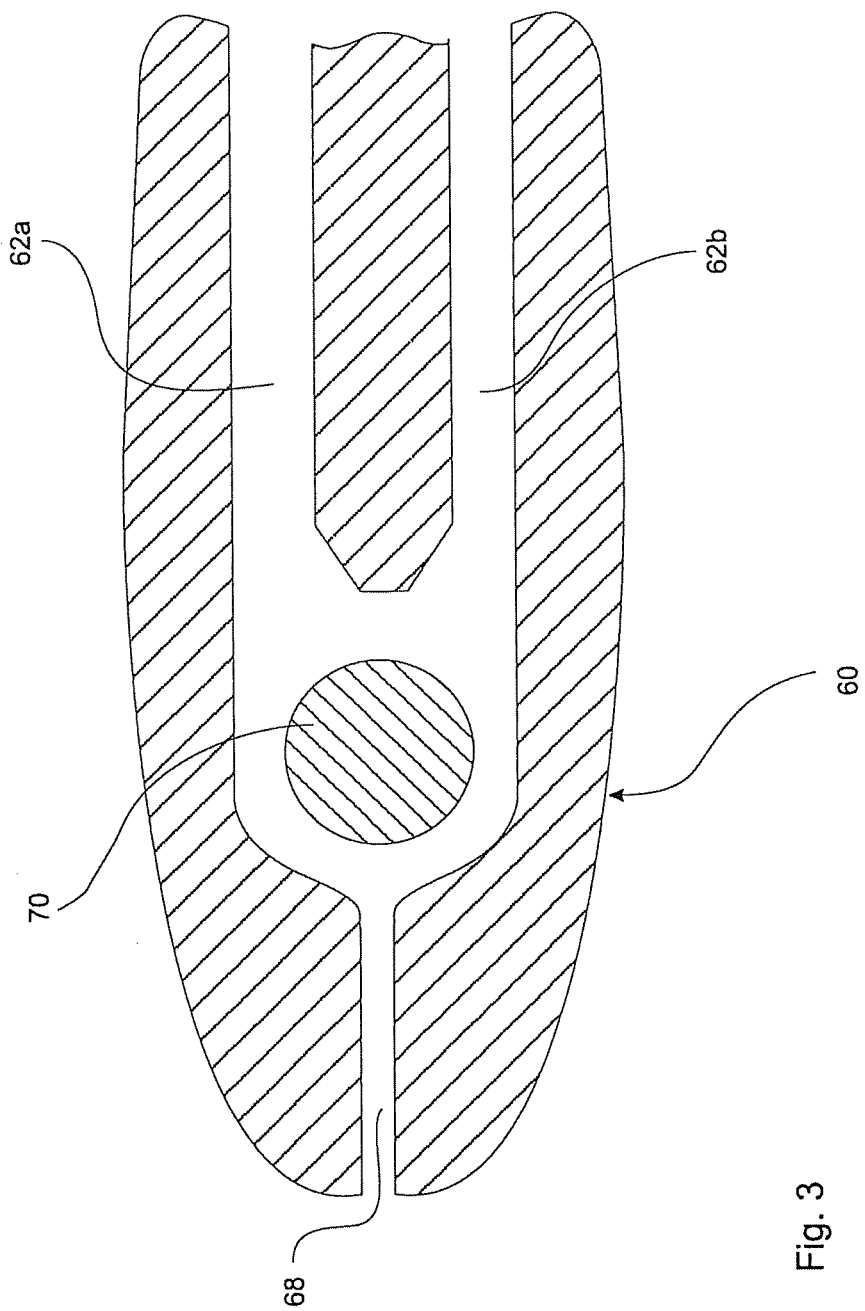
FIG. 3 shows another embodiment of a control pressure varying device

FIG. 3 shows another practical example of a control pressure varying device 60. In this case clearly lower volume throughputs are employed, so that the control feed line 68 may present a clearly smaller cross-section of flow. Curved walls 60a and 60b are not provided here, so that the two control lines 62a and 62b substantially extend in parallel with each other. Here, too, the flow body 70 has a round cross-section and may thus have a three-dimensional shape as may be seen, e.g., in FIGS. 10a to 10c. The operation of the particularly periodical, alternating vortex shedding at the flow body 70 for the alternatingly majoritary distribution to one of the two control lines 62a and 62b is here effected in the manner that was already explained in detail in the foregoing.

Figure 4:
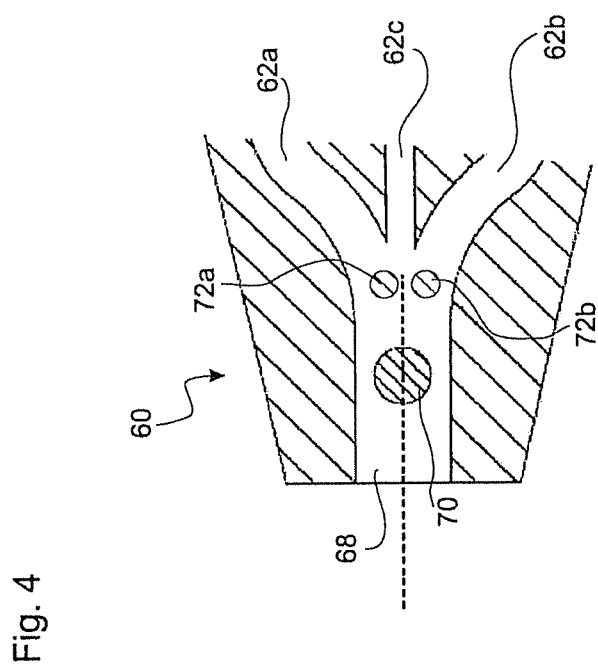
FIG. 4 shows another embodiment of a control pressure varying device

FIG. 4 shows another embodiment of a control pressure varying device 60 of the invention. This is developed further to the effect that when viewed in the direction of flow of the fluid from the control feed line 68, two pulsation assisting bodies 72a and 72b are provided downstream from the flow body 70. These two pulsation assisting bodies 72a and 72b are smaller in their cross-section than the flow body 70 and are situated, in geometrical terms, in a position in which once the one pulsation assisting body 72a and once the other pulsation assisting body 72b receives the greater proportion of the flow from the control feed line 68, depending on the side of vortex shedding and thus the preferential side for the flow around the flow body 70. Particularly for the case that the two pulsation assisting bodies 72a and 72b have a twofold pulsation frequency at an identical velocity of an enveloping flow, as is true for the flow body 70, this results in the following operation.

A continuously arriving fluid flow from the control feed line 68 flows around the flow body 70. Due to this enveloping flow and the realization of the flow body 70 particularly in the form of a cylinder, vortices alternatingly separate from the flow body periodically, once on the upper side and once on the lower side. As a result of such vortex shedding, the arriving flow of the fluid from the control feed line 68 follows the vortices to be distributed once to the upper pulsation assisting body 72a and once to the lower pulsation assisting body 72b for each periodicity phase. For each half pulsation periodicity phase of the flow body 70 the main part of the flow from the control feed line 68 thus is sent, for instance, to the upper pulsation assisting body 72a. The latter has in particular the twofold pulsation frequency of the flow body 70. During half the pulsation periodicity phase in which the main part of the flow from the control feed line 68 is thus applied to the upper pulsation assisting body 72a, the latter will perform a full period, i.e. two instances of vortex shedding. For each instance of vortex shedding the upper pulsation assisting body 72a distributes the greater proportion of the flow supplied to it from the control feed line 68, once to the first control line 62a and once to the third control line 62c. Likewise, during the second half of the periodicity phase of the flow body 70 the greater proportion of the flow from the control feed line 68 is applied to the lower pulsation assisting body 72b. The latter also performs two instances of vortex shedding during half the periodicity phase of the flow body 70, so that the greater proportion of the fluid flow from the control feed line 68 is applied once to the second control line 62b and once to the third control line 62c. In this way a maximum control pressure comes about in one of the control lines 62a, 62b and 62c in any situation, depending on the current vortex shedding frequency situation at the flow body 70 and the pulsation assisting bodies 72a and 72b. The subsequent control chamber 30 may here be realized such that three flow lines are provided which merge via three outlet lines into three outlet openings, whereby a control of a fluid actuator 10 for three outlet openings may be carried out. This cascade may be expanded at will, so that even a multiplicity of outlet openings may be employed by a system of the invention which does not include any mechanically movable components.

Figure 5:
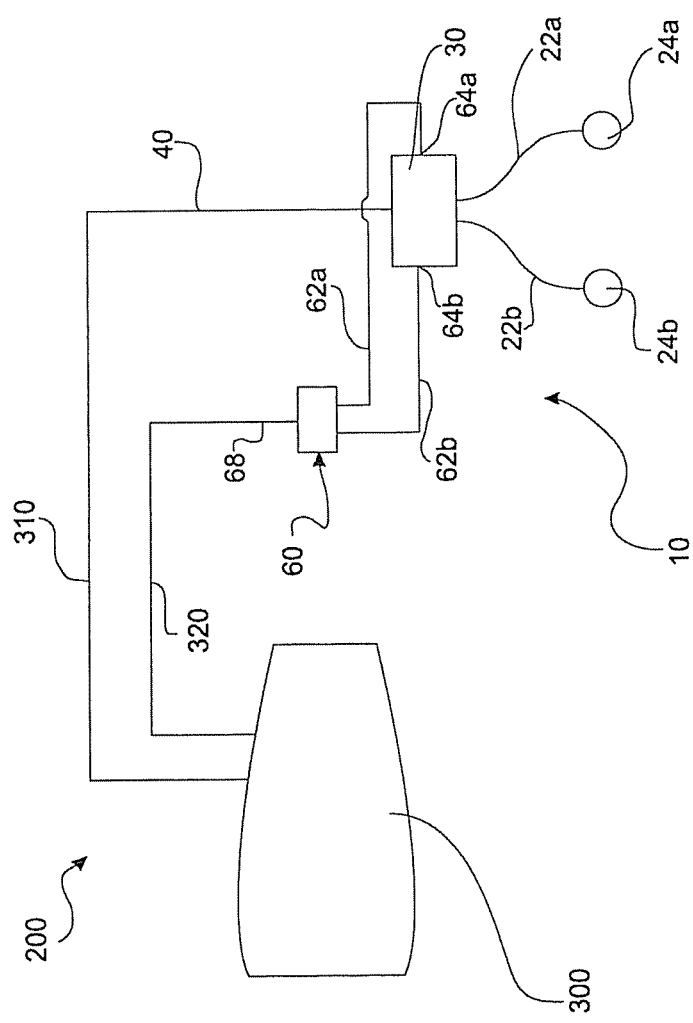
FIG. 5 shows a first embodiment of a blow-out device of the invention

FIG. 5 shows a first embodiment of a blow-out device of the invention 200. Here a fluid actuator 10 of the present invention is represented schematically. This fluid actuator 10 comprising interaction chamber 30, control pressure varying device 60 and corresponding control passages 62a, 62b and outlet lines 22a and 22b as well as control openings 64a and 64b and outlet openings 24a and 24b may be realized through an embodiment of FIG. 1, for example. The feed line 40 is connected to a supply line 310 which in turn is in fluid-communicating connection with a pressurized air supply device 300. The same is true for the control feed line 68 which is connected to a control supply line 320 which in turn also receives its pressurized air from the pressurized air supply device 300. Here the pressurized air supply device 300 may, for example, be the turbine of an aircraft that provides tapped air for the two supply lines 310 and 320. Alternatively the pressurized air supply device 300 may also be realized in a different manner, e.g. by openings at the bottom side of a flow body, through which air may enter into the corresponding supply line 310 and/or 320.

In the case of the embodiment of FIG. 5 which is particularly simple and cost-efficient and low-maintenance, not a single movable part is necessary to ensure the functionality of the fluid actuator of the invention 10. Furthermore it is sufficient if the supply line 310 allows a sufficiently large cross-section for providing a volume flow rate of the pulsation at, the outlet openings 24a and 24b. The control supply line 320 may present a clearly smaller cross-section, for it is possible to operate with clearly lower volume flow rates in order to produce different control pressures at the control openings 64a and 64b.

Figure 6:
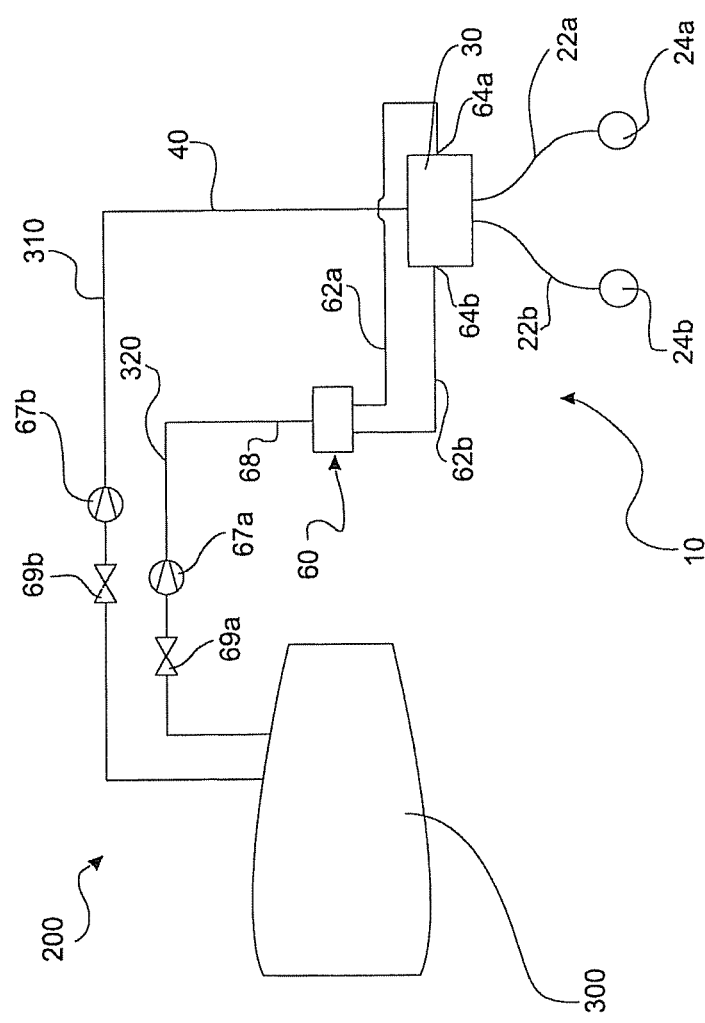
FIG. 6 shows another embodiment of a blow-out device of the invention

For fields of application where the pressurized air supply device 300 does not have a dedicated activity or no controllable activity, an embodiment of FIG. 6 is advantageous. Thus it is advantageous, for example in a pressurized air supply device 300 having the form of an opening which draws pressurized air from an enveloping flow of a flow body, if the variable flow that can not be influenced actively is adapted to be controlled actively within the blow-out device 200. In the embodiment of FIG. 6, active control takes place in two ways or in two directions, respectively.

On the one hand, throttle valves 69a and 69b are provided in both supply lines 310 and 320. With the aid of these throttle valves 69a and 69b it is possible to throttle the arriving fluid flow and thus decelerate its velocity, or to minimize the volume flow rate. Vice versa it is also possible by means of compressors 67a and 67b arranged downstream—or in contrast with the representation of FIG. 6 upstream—from the throttle valves 69a and 69b, to increase the velocity of the fluid flow or to increase the volume flow rate. With the aid of these compressors 67a and 67b a pressure increase or an increase of the volume flow rate may be carried out. With the aid of corresponding sensors a substantially constant status may thus be adjusted and remain adjusted in this way both in the control pressure varying device 60 and in the interaction chamber 30 by way of the ability of compensating, as it were, the variation of the pressurized air supply device 300 with the aid of the combination of compressors 67a and 67b with the throttle valves 69a and 69b.

Figure 7:
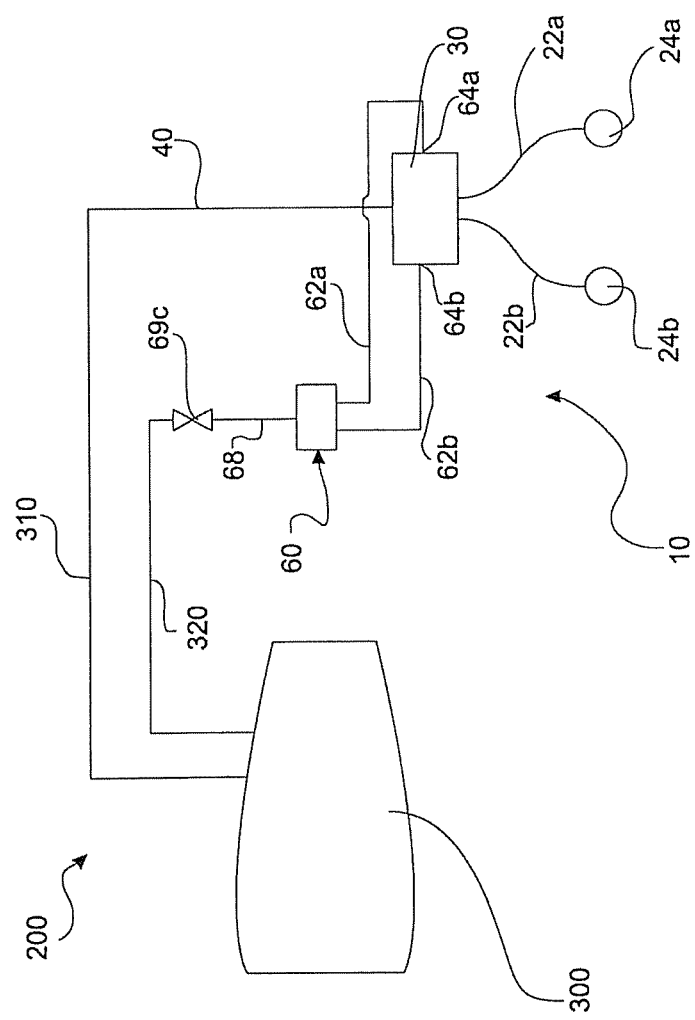
FIG. 7 shows another embodiment of a blow-out device of the invention

FIG. 7 shows an alternative embodiment for FIG. 6. Here a throttle valve 69c is present in the control feed line 68 of the fluid actuator 10. Hereby the entire complexity, including the throttle valve 69c, is provided in the fluid actuator 10.

The supply lines 310 and 320 may be realized in a correspondingly simple manner. The two embodiments of FIGS. 6 and 7 may, of course, also be combined with each other, so that throttle valves may be provided both in the supply lines 310 and 320 and also in the control feed line 68 and/or the feed line 40.

If, now, a more complex system is desired for a blow-out device 200 of the invention, particularly a system comprising a multiplicity of fluid actuators 10 of the present invention, it is possible to expand such a system at will by providing central supply lines 310 and 320.

Figure 8:
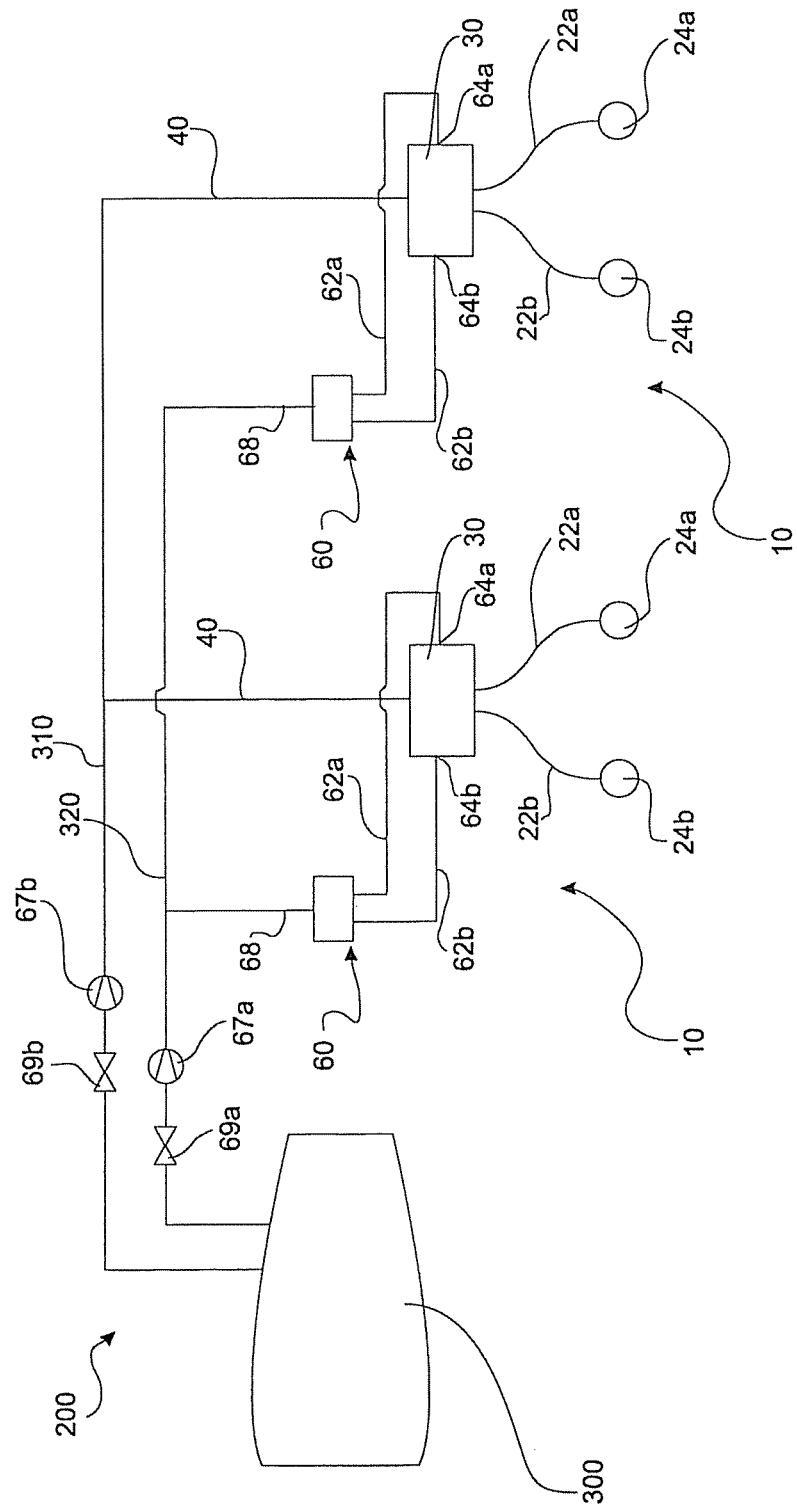
FIG. 8 shows another embodiment of a blow-out device of the invention

An example of a corresponding outlet device 200 is represented in FIG. 8. Here two fluid actuators 10 are arranged as an example of a multiplicity of fluid actuators 10, with two fluid actuators 10 being supplied with pressurized air by shared supply lines 310 and 320. The supply line 310 provides branches into all of the feed lines 40, so that all of the interaction chambers 30 of all the fluid actuators 10 are supplied with pressurized air from a common supply line 310. Likewise, the control supply line 320 provides branches into all of the control feed lines 68 of all the fluid actuators 10, so all of the control pressure varying devices are equally provided with pressurized air from a common control supply line 320.

Figure 9:
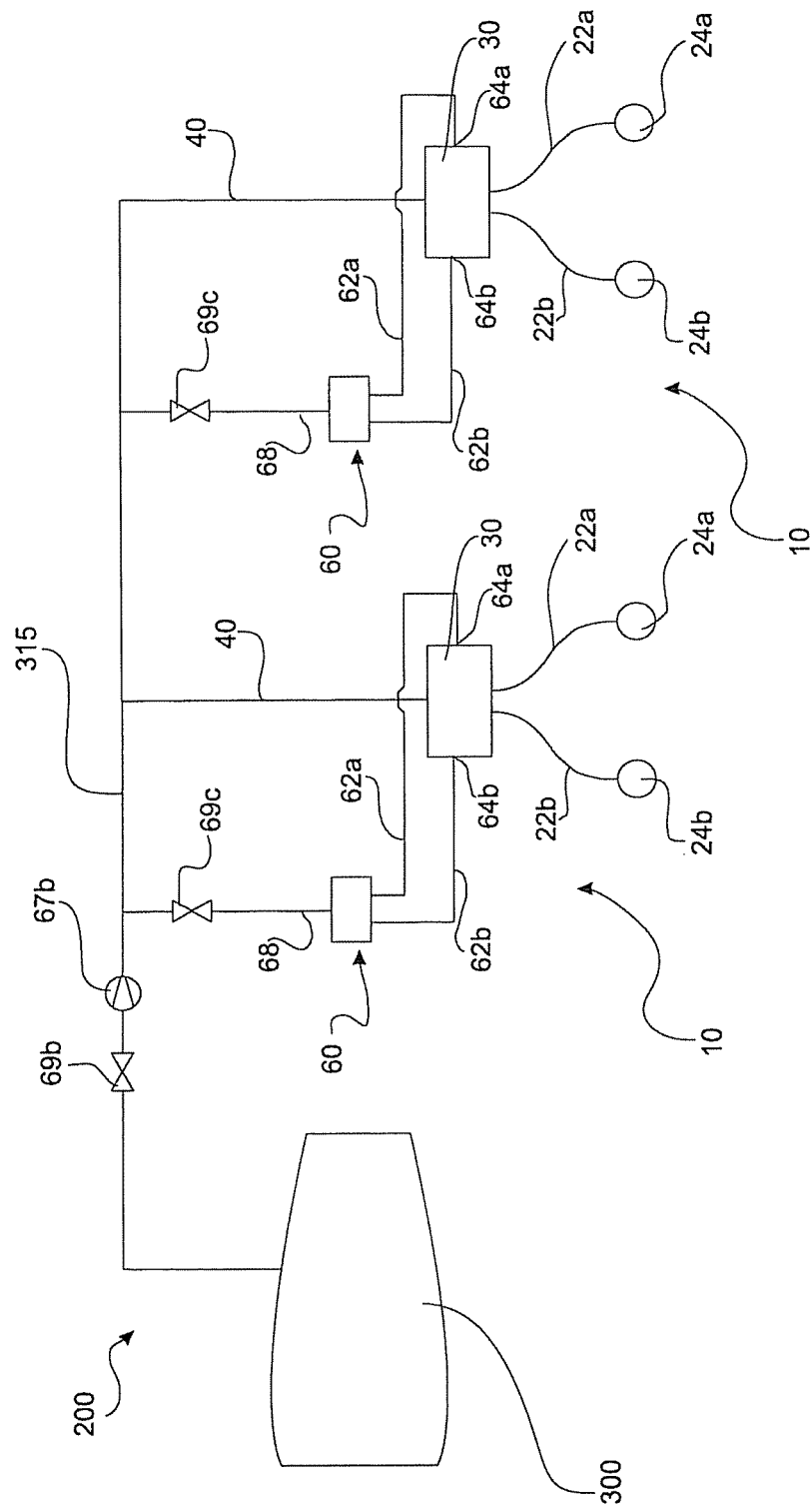
FIG. 9 shows another embodiment of a blow-out device of the invention

This embodiment of FIG. 8 may be simplified further, as is represented in FIG. 9. Here the two separate supply lines 310 and 320 were combined into a common supply line 315 from which two branches per fluid actuator 10 of the invention are branched off, with one being the feed line 40 and the other the control feed line 68 of the respective fluid actuator 10. As in such a case the fluid flow in terms of pressure and velocity in the common supply line 315 may also only be controlled or regulated jointly by way of a common throttle 69b and/or a common compressor 67b, it is advantageous if the individual feed lines furthermore provide separate optional regulation in such a case.

In FIG. 9 one throttle valve 69c is provided in each control feed line 68 for this optional regulation. Accordingly, despite a high volume throughput and a high pressure in the common supply line 315 that are sufficient for generating the necessary throughput in the feed line 40, it is possible to apply a clearly lower pressure and a clearly lower volume flow rate to the control feed line 68 via the throttle valve 69c. The loss for the feed line 40 is thus minimized by commonly supplying the common supply line 315.

It is a matter of fact that the present invention was represented merely by way of example through the description of the embodiments. The individual embodiments, particularly individual components or constitutent parts of the embodiments may, of course, be combined freely among each other without departing from the framework of the present invention whenever this is technically meaningful.

LIST OF REFERENCE SYMBOLS 10 fluid actuator
20 outlet device
22a outlet line
22b outlet line
24a outlet opening
24b outlet opening
30 interaction chamber
30a convexly curved wall
30b convexly curved wall
32 flow line
36 flow dividing device
40 feed line 60 control pressure varying device
60a convexly curved wall
60b convexly curved wall
62a control line
62b control line
62c control line
64a control opening
64b control opening
66 control flow dividing device
67a compressor
67b compressor
68 control feed line
69a throttle valve
69b throttle valve
69c throttle valve
70 flow body
72a pulsation assisting body
72b pulsation assisting body
200 blow-out device
300 pressurized air supply device
310 supply line
315 common line
320 control supply line
A axis of symmetry
SR direction of flow

The invention claimed is:

1. A fluid actuator for influencing a flow along a flow surface by ejection of a fluid flowing through the fluid actuator, the fluid actuator comprising:
an outlet device equipped with at least two outlet openings and at least two outlet lines merging into the outlet openings;
an interaction chamber which is in fluid-communicating connection via a respective flow line via a respective outlet line with one outlet opening each and which comprises a flow dividing device arranged at the inlet of the outlet lines;
a feed line routed to the interaction chamber for supplying fluid at a feed pressure into the interaction chamber; and
at least two control lines for supplying fluid at respective different control pressures into the interaction chamber via at least one respective control opening;
wherein the interaction chamber is realized such that due to supplying fluid through one of the control lines in a higher degree than through the other control lines, the fluid flowing through the feed line in the interaction chamber may correspondingly be deflected in an alternating majoritary manner into one respective outlet line associated to this control line; and
wherein the fluid actuator is equipped with a control pressure varying device comprising a control feed line and a control flow dividing device which connects the feed line to the control lines in a fluid-communicating manner, and a flow body arranged in the control feed line which is realized such that upon application of a flow by the control feed line by flowing around the flow body, vortices alternatingly detach from the latter when viewed transversely to a direction of flow, whereby the flow from the control feed line alternatingly arrives majoritarily in a respective one of the control lines so as to alternatingly create different control pressures at the control openings.

2. The fluid actuator according to claim 1, wherein at least one portion of a side of the flow body impinged and/or enveloped by the flow from the control feed line is curved and/or a Kármán vortex street is formed with aid of the flow body.

3. The fluid actuator according to claim 1, wherein the interaction chamber has convexly curved walls when viewed in a direction of the outlet lines from an interior of the interaction chamber, and due to application of the flow to a respective one of the walls a stable flow along this wall into the respective outlet line results when a lowest control pressure of all the control lines prevails in the control line that merges at the respective wall.

4. The fluid actuator according claim 1, wherein the control feed line of the control pressure varying device has convexly curved walls when viewed in a direction of the control lines from an interior of the control feed line, so that due to application of the flow to a respective one of the walls a stable flow along this wall into the respective control line results when due to the alternating detachment of vortices at the flow body the flow from the control feed line majoritarily arrives in the control line situated in continuation of this wall.

5. The fluid actuator according to claim 1, wherein at least two pulsation assisting bodies are arranged in the control feed line downstream from the flow body in the direction of flow, and that when viewed relative the direction of flow in the control feed line, at least three control lines are present side by side where fluid from the control feed line alternatingly arrives majoritarily in one of the control lines with aid of the flow body and the pulsation assisting bodies.

6. The fluid actuator according to claim 1, wherein at least one throttle valve for changing a flow velocity of the flow in the control feed line and thus of the fluid flowing around the flow body is arranged in the control feed line.

7. A blow-out device comprising at least one fluid actuator according to claim 1 and a pressurized air supply device comprising a control supply line which is in fluid-communicating connection with the control feed line, and/or a supply line which is in fluid-communicating connection with the feed line.

8. The blow-out device according to claim 7, wherein a throttle valve for influencing a flow velocity in the control supply line and/or the supply line is arranged in the control supply line and/or the supply line.

9. The blow-out device according to claim 7, wherein a compressor for influencing a flow velocity in the control supply line and/or the supply line is arranged in the control supply line and/or the supply line.

10. The blow-out device according to claim 7, wherein at least two fluid actuators are provided, and the control supply line is in fluid-communicating connection with the control feed lines of the fluid actuators and/or the supply line is in fluid-communicating connection with the feed lines of the fluid actuators.

11. The blow-out device according to claim 7, wherein the control supply line and the supply line are constituted by a common line.

12. A flow body comprising a plurality of outlet openings and at least one fluid actuator according to claim 1.

13. A flow body comprising a plurality of outlet openings and a blow-out device comprising at least one fluid actuator according to claim 1 and a pressurized air supply device comprising a control supply line which is in fluid-communicating connection with the control feed line, and/or a supply line which is in fluid-communicating connection with the feed line, wherein a throttle valve for influencing a flow velocity in the control supply line and/or the supply line is arranged in the control supply line and/or the supply line.

14. A fluid actuator for influencing a flow along a flow surface by ejection of a fluid flowing through the fluid actuator, the fluid actuator comprising:
- an outlet device equipped with at least two outlet openings and at least two outlet lines merging into the outlet openings;
- an interaction chamber which is in fluid-communicating connection via a respective flow line via a respective outlet line with one outlet opening each and which comprises a flow dividing device arranged at the inlet of the outlet lines;
- a feed line routed to the interaction chamber for supplying fluid at a feed pressure into the interaction chamber, the feed line comprising at least two pulsation assisting bodies arranged in the control feed line; and
- at least two control lines for supplying fluid at respective different control pressures into the interaction chamber via at least one respective control opening;
- wherein the interaction chamber is realized such that due to supplying fluid through one of the control lines in a higher degree than through the other control lines, the fluid flowing through the feed line in the interaction chamber may correspondingly be deflected in an alternating majoritary manner into one respective outlet line associated to this control line;
- wherein the fluid actuator is equipped with a control pressure varying device comprising a control feed line and a control flow dividing device which connects the feed line to the control lines in a fluid-communicating manner, and a flow body arranged in the control feed line which is realized such that upon application of a flow by the control feed line by flowing around the flow body, vortices alternatingly detach from the latter when viewed transversely to a direction of flow, whereby the flow from the control feed line alternatingly arrives majoritarily in a respective one of the control lines so as to alternatingly create different control pressures at the control openings; and
- wherein the at least two pulsation assisting bodies are arranged downstream from the flow body in the direction of flow, and that when viewed relative the direction of flow in the control feed line, at least three control lines are present side by side where fluid from the control feed line alternatingly arrives majoritarily in one of the control lines with aid of the flow body and the pulsation assisting bodies.

* * * * *